United States Patent
Adkins et al.

(10) Patent No.: US 7,754,846 B2
(45) Date of Patent: Jul. 13, 2010

(54) THERMAL PROCESSES FOR INCREASING POLYARENEAZOLE INHERENT VISCOSITIES

(75) Inventors: Qinghong Fu Adkins, Collinsville, VA (US); Doetze Jakob Sikkema, Wageningen (NL); Steven R. Allen, Midlothian, VA (US); David J. Rodini, Midlothian, VA (US)

(73) Assignees: E. I. du Pont de Nemours and Company, Wilmington, DE (US); Magellan Systems International, LLC, Richmond, VA (US)

( * ) Notice: Subject to any disclaimer, the term of this patent is extended or adjusted under 35 U.S.C. 154(b) by 988 days.

(21) Appl. No.: 11/390,859

(22) Filed: Mar. 27, 2006

(65) Prior Publication Data

US 2007/0100120 A1    May 3, 2007

Related U.S. Application Data

(60) Provisional application No. 60/665,747, filed on Mar. 28, 2005.

(51) Int. Cl.
*C08G 63/78*    (2006.01)
*C08G 63/81*    (2006.01)
*C08G 63/02*    (2006.01)
*C08G 63/46*    (2006.01)
*C08G 63/183*   (2006.01)

(52) U.S. Cl. .................. 528/288; 528/272; 528/308; 528/487; 528/491; 528/503

(58) Field of Classification Search .............. 528/272, 528/487, 491, 503, 288, 308
See application file for complete search history.

(56) References Cited

U.S. PATENT DOCUMENTS

| 3,227,793 A | 1/1966 | Cipriani ................. 264/203 |
| 3,414,645 A | 12/1968 | Morgan, Jr. ............. 264/210 |
| 3,424,720 A | 1/1969 | Rudner et al. ............ 260/47 |
| 3,767,756 A | 10/1973 | Blades ................... 264/184 |
| 3,804,804 A | 4/1974 | Gerber et al. .......... 260/47 CP |
| 3,940,955 A | 3/1976 | Welsh ...................... 68/20 |
| 3,996,321 A | 12/1976 | Weinberger ............ 264/40.3 |
| 4,002,679 A | 1/1977 | Arnold ................. 260/556 A |
| 4,070,431 A | 1/1978 | Lewis et al. ............ 264/180 |
| 4,078,034 A | 3/1978 | Lewis .................... 264/181 |
| 4,079,039 A | 3/1978 | Gerber ................ 260/47 CP |
| 4,298,565 A | 11/1981 | Yang ..................... 264/181 |
| 4,452,971 A | 6/1984 | Choe et al. .............. 528/336 |
| 4,533,693 A | 8/1985 | Wolfe et al. ............. 524/417 |
| 4,703,103 A | 10/1987 | Wolfe et al. ............. 528/179 |
| 4,772,678 A | 9/1988 | Sybert et al. ............ 528/179 |

(Continued)

FOREIGN PATENT DOCUMENTS

EP    0 481 403 B1    5/1996

(Continued)

OTHER PUBLICATIONS

Gerber, A.H., "Thermally stable polymers derived from 2,3,5,6-tetraaminopyridine," J. of Polymer Science, 1973, 11, 1703-1719.

(Continued)

*Primary Examiner*—Duc Truong
(74) *Attorney, Agent, or Firm*—Woodcock Washburn LLP

(57) ABSTRACT

Disclosed are thermal processes for increasing polyareneazole inherent viscosities.

20 Claims, 1 Drawing Sheet

U.S. PATENT DOCUMENTS

| | | | | |
|---|---|---|---|---|
| 4,845,150 | A | 7/1989 | Kovak et al. | 524/602 |
| 4,847,350 | A | 7/1989 | Harris | 528/179 |
| 4,898,924 | A | 2/1990 | Chenevey et al. | 528/183 |
| 4,939,235 | A | 7/1990 | Harvey et al. | 528/337 |
| 4,963,428 | A | 10/1990 | Harvey et al. | 428/220 |
| 5,041,522 | A | 8/1991 | Dang et al. | 528/183 |
| 5,089,591 | A | 2/1992 | Gregory et al. | 528/185 |
| 5,168,011 | A | 12/1992 | Kovar et al. | 428/373 |
| 5,276,128 | A | 1/1994 | Rosenberg et al. | 528/184 |
| 5,367,042 | A | 11/1994 | Pierini et al. | 528/183 |
| 5,393,478 | A | 2/1995 | Sen et al. | 264/203 |
| 5,429,787 | A | 7/1995 | Im et al. | 264/344 |
| 5,525,638 | A | 6/1996 | Sen et al. | 521/61 |
| 5,552,221 | A | 9/1996 | So et al. | 428/373 |
| 5,667,743 | A | 9/1997 | Tai et al. | 264/184 |
| 5,674,969 | A | 10/1997 | Sikkema et al. | 528/183 |
| 5,772,942 | A | 6/1998 | Teramoto et al. | 264/184 |
| 6,228,922 | B1 | 5/2001 | Wang et al. | 542/413 |
| 2003/0083421 | A1 | 5/2003 | Kumar et al. | 524/496 |
| 2006/0019094 | A1 | 1/2006 | Lee | 428/364 |

FOREIGN PATENT DOCUMENTS

| | | |
|---|---|---|
| EP | 0 834 608 B1 | 3/2002 |
| EP | 1 553 143 A1 | 7/2005 |
| GB | 1 361 840 | 7/1974 |
| JP | 06-240596 | 8/1994 |
| JP | 09-78349 | 3/1997 |
| WO | WO 91/02764 A1 | 3/1991 |
| WO | WO 94/12702 A1 | 6/1994 |
| WO | WO 96/20303 A1 | 7/1996 |
| WO | WO 99/27169 A1 | 6/1999 |
| WO | WO2004/003080 A1 | 1/2004 |
| WO | WO2004/003269 A1 | 1/2004 |
| WO | WO2004/024797 A1 | 2/2004 |
| WO | WO 2006/014718 A1 | 2/2006 |
| WO | WO2006/105076 A2 | 10/2006 |
| WO | WO2006/105225 A1 | 10/2006 |
| WO | WO2006/105226 A1 | 10/2006 |
| WO | WO2006/105231 A1 | 10/2006 |

OTHER PUBLICATIONS

Lammers, M., et al., "Mechanical properties and structural transitions in the new rigid-rod polymer fibre PIPD ('M5') during the manufacturing process," Elsevier Sci. Ltd., 1997, S0032-3861, 7 pages.

Sikkema, D.J., "Design, synthesis and properties of a novel rigid rod polymer, PIPD or 'M5': high modulus and tenacity fibers with substantial compressive strength," Polymer, 1998, 39(24), 5981-5986.

US 7,754,846 B2

THERMAL PROCESSES FOR INCREASING POLYARENEAZOLE INHERENT VISCOSITIES

CROSS REFERENCE TO RELATED APPLICATIONS

This application claims the benefit of U.S. Application No. 60/665,747; filed Mar. 28, 2005, the entirety of which is incorporated by reference herein.

FIELD OF THE INVENTION

The present invention generally relates to rigid-rod polymers and processes for the preparation of such polymers. In particular, the present invention relates to methods of increasing the inherent viscosity of rigid-rod polymers that are suitable for spinning into filaments and yarns.

BACKGROUND OF THE INVENTION

Advances in polymer chemistry and technology over the last few decades have enabled the development of high-performance polymeric fibers. For example, liquid-crystalline polymer solutions of [aromatic polyamides, such as poly(p-phenylene terephthalamide), can be spun into high strength aramid fibers. Heterocyclic rigid-rod polymers may be formed into high strength fibers by spinning liquid-crystalline solutions into wet fibers, removing solvent to dry the fibers, and heat treating the dried fibers. For example, heat treated fibers of poly(p-phenylene benzobisthiazole) ("PBZT") can be produced having tensile modulus values of about 320 GPa. Similarly, commercially-available poly(p-phenylene-2,6-benzobisoxazole) ("PBO") fibers, are produced having a tensile modulus of about 280 GPa.

Fiber strength is typically correlated to one or more polymer parameters, including composition, molecular weight, intermolecular interactions, backbone, residual solvent or water, macromolecular orientation, and process history. For example, fiber strength typically increases with polymer length (i.e., molecular weight), polymer orientation, and the presence of strong attractive intermolecular interactions. As high molecular weight rigid-rod polymers are useful for forming polymer solutions ("dopes") from which fibers can be spun, increasing molecular weight typically results in increased fiber strength.

Molecular weights of rigid-rod polymers are typically monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh}=\ln(V_{rel})/C,$$

where ln is the natural logarithm function and C is the concentration of the polymer solution. $V_{rel}$ is a unitless ratio, thus $V_{inh}$ is expressed in units of inverse concentration, typically as deciliters per gram ("dl/g").

Rigid-rod polymer fibers having strong hydrogen bonds between polymer chains, e.g., polypyridobisimidazoles, have been described in U.S. Pat. No. 5,674,969 to Sikkema et al.). Polypyridobisimidazoles of relatively high molecular weight, such as for example, poly{2,6-diimidazo[4,5-b:4',5'-e]pyridinylene-1,4-(2,5-dihydroxy)phenylene}, more commonly known as ("PIPD") may be prepared by the condensation polymerization of tetraaminopyridine and 2,5-dihydroxyterephthalic acid in polyphosphoric acid. Sikkema describes that in making one- or two-dimensional objects, such as fibers, films, tapes, and the like, it is desired that polypyridobisimidazoles should have a relative viscosity ("$V_{rel}$" or "$\eta_{rel}$") in 0.25 g/dl in methane sulphonic acid at 25 degrees Celsius of at least 3.5, preferably at least 5, and more particularly, equal to or higher than about 10. Sikkema also discloses that very good fiber spinning results are obtained with poly{2,6-diimidazo[4,5-b:4',5'-e]pyridinylene-1,4-(2,5-dihydroxy)phenylene} having relative viscosities greater than about 12, and that relative viscosities of over 50 (corresponding to inherent viscosities greater than about 15.6 dl/g) can be achieved. Accordingly, further technical advances are needed to provide even higher molecular weight rigid-rod polymers, such as polypyridobisimidazoles, that are characterized as having even greater viscosities.

SUMMARY OF THE INVENTION

The present invention is directed, in part, to processes for making polyareneazole comprising the steps of contacting a complex comprising aromatic or heteroaromatic tetraamine and aromatic or heteroaromatic diacid in a dehydrating solvent, wherein each amine group of said tetraamine is positioned on the aromatic or heteroaromatic ring moiety adjacent to at least one of the remaining amine groups of said tetraamine, and wherein the acid groups of said diacid are bonded to non-adjacent aromatic or heteroaromatic ring carbon atoms of said diacid; and heating the mixture with agitation to a temperature of about 90 to about 110° C. for a period of about 30 to about 100 minutes; heating the mixture from the first step with agitation to a temperature of about 130 to about 145° C. for a period of about 75 to about 300 minutes; heating the mixture from the second step with agitation to a temperature of about 175 to about 185° C. for a period of about 40 to about 90 minutes; and heating the mixture from the third step with agitation to a temperature of about 186 to about 220° C. for a period of about 15 to about 90 minutes to provide said polyareneazole.

The present invention is also directed, in part, to processes for making polyareneazole comprising the steps of contacting aromatic or heteroaromatic tetraamine and aromatic or heteroaromatic diacid in a dehydrating solvent, wherein each amine group of said tetraamine is positioned on the aromatic or heteroaromatic ring moiety adjacent to at least one of the remaining amine groups of said tetraamine, and wherein the acid groups of said diacid are bonded to non-adjacent aromatic or heteroaromatic ring carbon atoms of said diacid; heating the mixture with agitation to a temperature of about 90 to about 110° C. for a period of about 30 to about 100 minutes; heating the mixture from the first step with agitation to a temperature of about 130 to about 145° C. for a period of about 75 to about 300 minutes; heating the mixture from the second step with agitation to a temperature of about 175 to about 185° C. for a period of about 40 to about 90 minutes; and heating the mixture from the third step with agitation to a temperature of about 186 to about 220° C. for a period of about 15 to about 90 minutes to provide said polyareneazole.

BRIEF DESCRIPTION OF THE DRAWINGS

The foregoing summary, as well as the following detailed description, is further understood when read in conjunction with the appended drawings. For the purpose of illustrating the invention, there is shown in the drawings exemplary embodiments of the invention; however, the invention is not limited to the specific methods, compositions, and devices disclosed. In the drawings.

DETAILED DESCRIPTION OF ILLUSTRATIVE EMBODIMENTS

Figure 1:
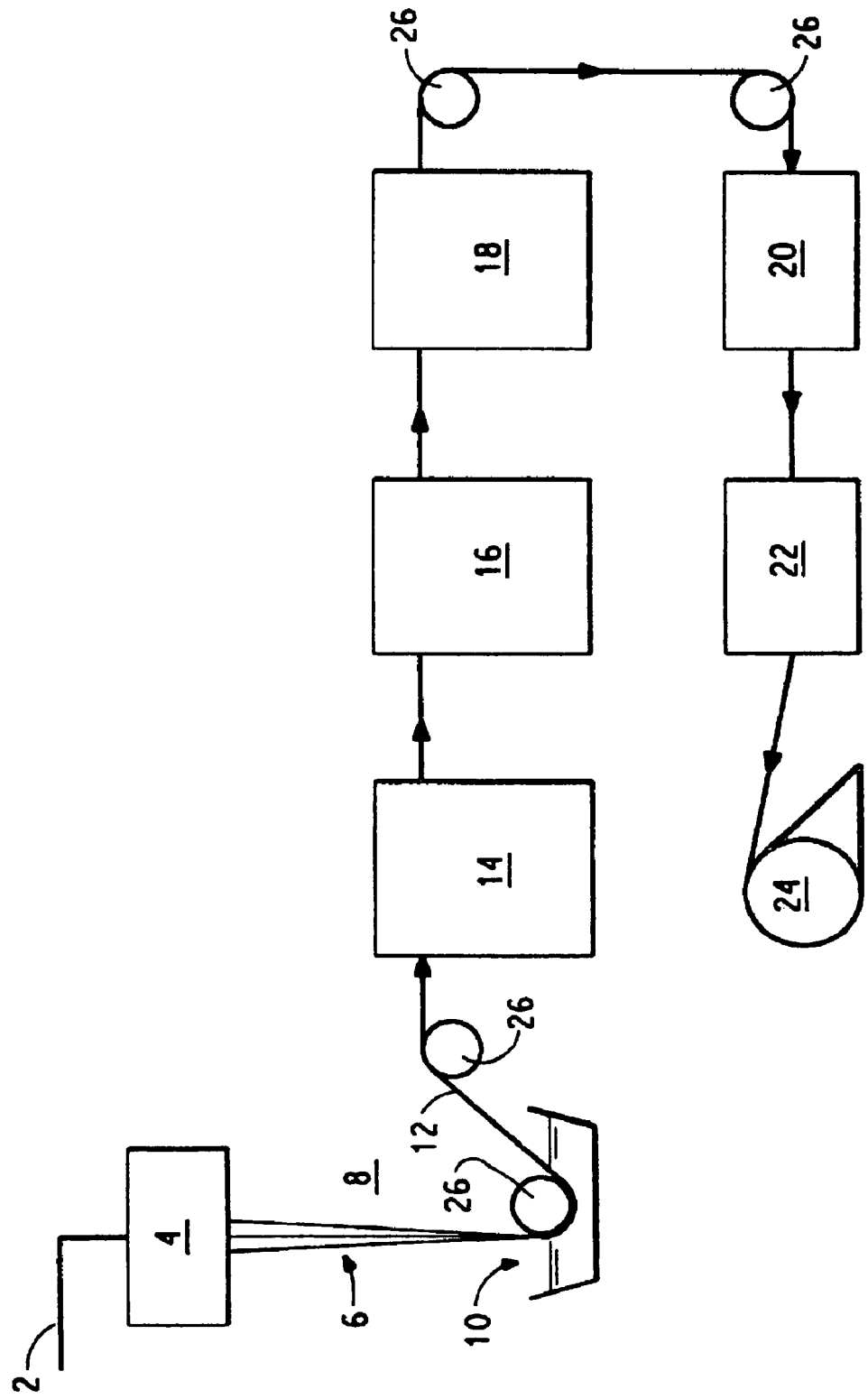
FIG. 1 is a schematic diagram of a polyareneazole fiber production process.

As employed above and throughout the disclosure, the following terms, unless otherwise indicated, shall be understood to have the following meanings.

Filaments of the present invention can be made from polyareneazole polymer. As defined herein, "polyareneazole" refers to polymers having either:
one heteroaromatic ring fused with an adjacent aromatic group (Ar) of repeating unit structure (a):

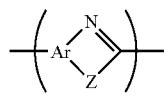

wherein N is a nitrogen atom and Z is a sulfur, oxygen, or NR group wherein R is hydrogen or a substituted or unsubstituted alkyl or aryl attached to N; or
two hetero aromatic rings each fused to a common aromatic group ($Ar^1$) of either of the repeating unit structures (b1 or b2):

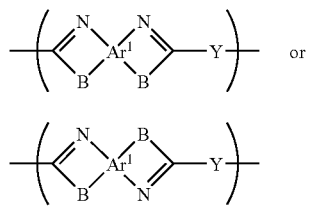

wherein N is a nitrogen atom and B is an oxygen, sulfur, or NR group, wherein R is hydrogen or a substituted or unsubstituted alkyl or aryl attached to N. The number of repeating unit structures represented by structures (a), (b1), and (b2) is not critical. Preferably, each polymer chain has from 10 to 25,000 repeating units. Polyareneazole polymers include polybenzazole polymers or polypyridazole polymers or both. In certain embodiments, the polybenzazole polymers comprise polybenzimidazole or polybenzobisimidazole polymers. In certain other embodiments, the polypyridazole polymers comprise polypyridobisimidazole or polypyridoimidazole polymers. In certain preferred embodiments, the polymers are of a polybenzobisimidazole or polypyridobisimidazole type.

In structure (b1) and (b2), Y is an aromatic, heteroaromatic, aliphatic group, or nil; preferably an aromatic group; more preferably a six-membered aromatic group of carbon atoms. Still more preferably, the six-membered aromatic group of carbon atoms (Y) has para-oriented linkages with two substituted hydroxyl groups; even more preferably 2,5-dihydroxy-para-phenylene.

In structures (a), (b1), or (b2), Ar and $Ar^1$ each represent any aromatic or heteroaromatic group. The aromatic or heteroaromatic group can be a fused or non-fused polycyclic system, but is preferably a single six-membered ring. More preferably, the Ar or $Ar^1$ group is heteroaromatic, wherein a nitrogen atom is substituted for one of the carbon atoms of the ring system, or Ar or $Ar^1$ may contain only carbon ring atoms. Still more preferably, the Ar or $Ar^1$ group is heteroaromatic.

As herein defined, "polybenzazole" refers to polyareneazole polymer having repeating structure (a), (b1), or (b2) wherein the Ar or $Ar^1$ group is a single six-membered aromatic ring of carbon atoms. Preferably, polybenzazoles are a class of rigid rod polybenzazoles having the structure (b1) or (b2); more preferably rigid rod polybenzazoles having the structure (b1) or (b2) with a six-membered carbocyclic aromatic ring $Ar^1$. Such preferred polybenzazoles include, but are not limited to polybenzimidazoles (B=NR), polybenzthiazoles (B=S), polybenzoxazoles (B=O), and mixtures or copolymers thereof. When the polybenzazole is a polybenzimidazole, preferably it is poly(benzo[1,2-d:4,5-d']bisimidazole-2,6-diyl-1,4-phenylene). When the polybenzazole is a polybenzthiazole, preferably it is poly(benzo[1,2-d:4,5-d']bisthiazole-2,6-diyl-1,4-phenylene). When the polybenzazole is a polybenzoxazole, preferably it is poly(benzo[1,2-d:4,5-d']bisoxazole-2,6-diyl-1,4-phenylene).

As herein defined, "polypyridazole" refers to polyareneazole polymer having repeating structure (a), (b1), or (b2) wherein the Ar or $Ar^1$ group is a single six-membered aromatic ring of five carbon atoms and one nitrogen atom. Preferably, these polypyridazoles are a class of rigid rod polypyridazoles having the structure (b1) or (b2), more preferably rigid rod polypyridazoles having the structure (b1) or (b2) with a six-membered heterocyclic aromatic ring $Ar^1$. Such more preferred polypyridazoles include, but are not limited to polypyridobisimidazole (B=NR), polypyridobisthiazole (B=S), polypyridobisoxazole (B=O), and mixtures or copolymers thereof. Yet more preferred, the polypyridazole is a polypyridobisimidazole (B=NR) of structure:

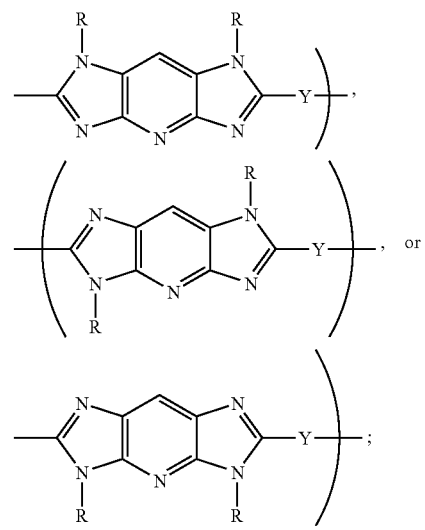

wherein N is a nitrogen atom, R is hydrogen or a substituted or unsubstituted alkyl or aryl attached to N, preferably wherein R is H, and Y is as previously defined. The number of repeating structures or units represented by structures is not critical. Preferably, each polymer chain has from 10 to 25,000 repeating units.

As used herein, "dehydrating solvent" refers to a solvent capable of complexing, reacting away, capturing, or otherwise removing the water of reaction formed during the polymerization.

"Alkyl" refers to an optionally substituted, saturated straight, or branched, hydrocarbon radical having from about 1 to about 20 carbon atoms (and all combinations and subcombinations of ranges and specific numbers of carbon atoms therein). Alkyl groups include, but are not limited to, methyl, ethyl, n-propyl, isopropyl, n-butyl, isobutyl, t-butyl, n-pentyl. isopentyl, neopentyl, n-hexyl, isohexyl, 3-methylpentyl, 2,2-dimethylbutyl, and 2,3-dimethylbutyl.

"Alkoxy" refers to an optionally substituted alkyl-O— group wherein alkyl is as previously defined. Exemplary alkoxy and alkoxyl groups include methoxy, ethoxy, n-propoxy, i-propoxy, n-butoxy, and heptoxy.

"Aryl" refers to an optionally substituted, mono-, di-, tri-, or other multicyclic aromatic ring system having from about 5 to about 50 carbon atoms (and all combinations and subcombinations of ranges and specific numbers of carbon atoms therein), with from about 6 to about 10 carbons being preferred. Non-limiting examples include, for example, phenyl, naphthyl, anthracenyl, and phenanthrenyl.

"Heteroaryl" refers to an optionally substituted aryl ring system wherein in at least one of the rings, one or more of the carbon atom ring members is independently replaced by a heteroatom group selected from the group consisting of S, O, N, and NH, wherein aryl is as previously defined. Heteroaryl groups having a total of from about 5 to about 14 carbon atom ring members and heteroatom ring members(and all combinations and subcombinations of ranges and specific numbers of carbon and heteroatom ring members) are preferred. Exemplary heteroaryl groups include, but are not limited to, pyrryl, furyl, pyridyl, pyridine-N-oxide, 1,2,4-thiadiazolyl, pyrimidyl, thienyl, isothiazolyl, imidazolyl, tetrazolyl, pyrazinyl, pyrimidyl, quinolyl, isoquinolyl, thiophenyl, benzothienyl, isobenzofuryl, pyrazolyl, indolyl, purinyl, carbazolyl, benzimidazolyl, and isoxazolyl. Heteroaryl may be attached via a carbon or a heteroatom to the rest of the molecule.

Typically, substituted chemical moieties include one or more substituents that replace hydrogen. Exemplary substituents include, for example, halo (e.g., F, Cl, Br, I), alkyl, cycloalkyl, alkylcycloalkyl, cycloalkylalkyl, alkenyl, alkynyl, aralkyl, aryl, heteroaryl, heteroaralkyl, spiroalkyl, heterocycloalkyl, hydroxyl (—OH), nitro (—NO$_2$), cyano (—CN), amino (—NH$_2$), —N-substituted amino (—NHR"), —N,N-disubstituted amino (—N(R")R"), oxo (=O), carboxy (—COOH), —O—C(=O)R", alkoxycarbonyl (—C(=O)R"), —OR", —C(=O)OR", -(alkylene)-C(=O)—OR", —NHC(=O)R", aminocarbonyl (—C(=O)NH$_2$), —N-substituted aminocarbonyl (—C(=O)NHR"), —N,N-disubstituted aminocarbonyl (—C(=O)N(R")R"), thiol, thiolato (—SR"), sulfonic acid (—SO$_3$H), phosphonic acid (—PO$_3$H), —P(=O)(OR")OR", —S(=O)R", —S(=O)$_2$R", —S(=O)$_2$NH$_2$, —S(=O)$_2$NHR", —S(=O)$_2$NR"R", —NHS(=O)$_2$R", —NR"S(=O)$_2$R", —CF$_3$, —CF$_2$CF$_3$, —NHC(=O)NHR", —NHC(=O)NR"R", —NR"C(=O)NHR", —NR"C(=O)NR"R", —NR"C(=O)R" and the like. In relation to the aforementioned substituents, each moiety R" can be, independently, any of H, alkyl, cycloalkyl, alkenyl, aryl, aralkyl, heteroaryl, or heterocycloalkyl, for example.

Filaments of the present invention are prepared from polybenazazole (PBZ) or polypyridazole polymers. For purposes herein, the term "filament" or "fiber" refers to a relatively flexible, macroscopically substantially homogeneous body having a high ratio of length to width across its cross-sectional area perpendicular to its length. The filament cross section may be any shape, but is typically circular.

As herein defined, "yarn" refers to a number of filaments laid, bundled, or assembled together with or without a degree of twist or interlacing, forming a continuous strand, which can be used, for example, in weaving, knitting, plaiting, or braiding, wherein fiber is as defined hereinabove.

For purposes herein, "fabric" refers to any woven, knitted, or non-woven structure. By "woven" is meant any fabric weave, such as, plain weave, crowfoot weave, basket weave, satin weave, twill weave, and the like. By "knitted" is meant a structure produced by interlooping or intermeshing one or more ends, fibers or multifilament yarns. By "non-woven" is meant a network of fibers, including unidirectional fibers, felt, and the like.

As herein defined, "coagulation bath" refers to a medium provided to coagulate the dope filament. The bath comprises a liquid, typically an alcohol, water, aqueous acid, or other aqueous liquid mixture. Preferably, the bath is water or aqueous phosphoric acid, but the liquid may be anything that provides water or other moiety that may assist in the hydrolysis of PPA.

In some embodiments, the more preferred rigid rod polypyridazoles include, but are not limited to polypyridobisimidazole homopolymers and copolymers such as those described in U.S. Pat. No. 5,674,969 (to Sikkema, et al. on Oct. 7, 1997). One such exemplary polypyridobisimidazole is homopolymer poly{2,6-diimidazo[4,5-b:4',5'-e]pyridinylene-1,4-(2,5-dihydroxy)phenylene}.

The polyareneazole polymers used in this invention may have properties associated with a rigid-rod structure, a semi-rigid-rod structure, or a flexible coil structure; preferably a rigid rod structure. When this class of rigid rod polymers has structure (b1) or (b2) it preferably has two azole groups fused to the aromatic group $Ar^1$.

Suitable polyareneazoles useful in this invention include homopolymers and copolymers. Up to as much as 25 percent by weight of other polymeric material can be blended with the polyareneazole. Also copolymers may be used having as much as 25 percent or more of other polyareneazole monomers or other monomers substituted for a monomer of the majority polyareneazole Suitable polyareneazole homopolymers and copolymers can be made by known procedures, such as those described in U.S. Pat. No. 4,533,693 (to Wolfe et al. on Aug. 6, 1985), U.S. Pat. No. 4,703,103 (to Wolfe et al. on Oct. 27, 1987), U.S. Pat. No. 5,089,591 (to Gregory et al. on Feb. 18, 1992), U.S. Pat. No. 4,772,678 (Sybert et al. on Sep. 20, 1988), U.S. Pat. No. 4,847,350 (to Harris et al. on Aug. 11, 1992), U.S. Pat. No. 5,276,128 (to Rosenberg et al. on Jan. 4, 1994) and U.S. Pat. No. 5,674,969 (to Sikkema, et al. on Oct. 7 1997). Additives may also be incorporated in the polyareneazole in desired amounts, such as, for example, anti-oxidants, lubricants, ultra-violet screening agents, colorants, and the like.

This invention is generally directed to polyareneazole filaments, more specifically to polybenzazole (PBZ) filaments or polypyridazole filaments, and processes for the preparation of such filaments. The invention further relates to yarns, fabrics, and articles incorporating filaments of this invention and processes for making such yarns, fabrics, and articles.

When any variable occurs more than one time in any constituent or in any formula, its definition in each occurrence is independent of its definition at every other occurrence. Combinations of substituents and/or variables are permissible only if such combinations result in stable compounds.

Accordingly, in certain embodiments, the present invention is directed to processes for making polyareneazole comprising the steps of contacting a complex comprising aromatic or heteroaromatic tetraamine and aromatic or heteroaromatic diacid in a dehydrating solvent, wherein each amine group of said tetraamine is positioned on the aromatic or heteroaromatic ring moiety adjacent to at least one of the remaining amine groups of said tetraamine, and wherein the acid groups of said diacid are bonded to non-adjacent aromatic or heteroaromatic ring carbon atoms of said diacid; and heating with agitation to a temperature of about 90 to about 110° C. for a period of about 30 to about 100 minutes; further heating the mixture with agitation to a temperature of about 130 to about 145° C. for a period of about 75 to about 300 minutes; further heating the mixture with agitation to a temperature of about 175 to about 185° C. for a period of about 40 to about 90 minutes; and further heating the mixture with agitation to a temperature of about 186 to about 220° C. for a period of about 15 to about 90 minutes to provide said polyareneazole. In certain embodiments, the dehydrating solvent is typically polyphosphoric acid. In some embodiments, the complex comprises 2, 3, 5, 6-tetraaminopyridine and terephthalic acid. In other embodiments, the aromatic or heteroaromatic tetraamine comprises a compound of formula Ia, Ib, Ic, Id, or Ie:

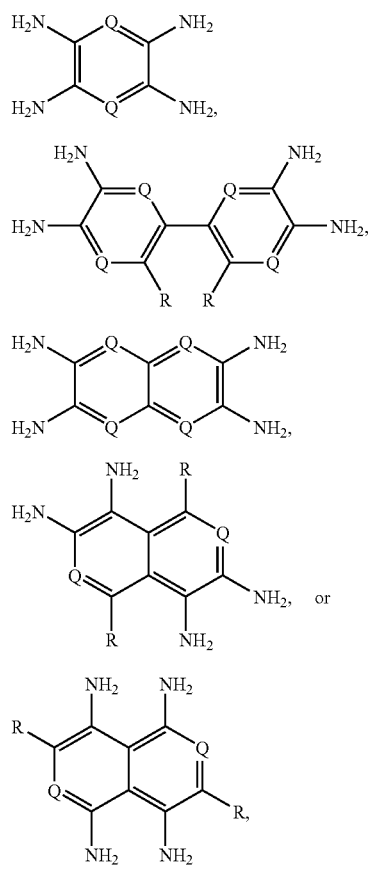

or any combination thereof,
wherein:
each Q is independently CR or N; and
each R is independently H, alkyl, aryl, heteroaryl, or alkoxy; preferably wherein aromatic or heteroaromatic tetraamine comprises a compound selected from the group consisting of 2,3,5,6-tetraaminopyridine, 1,2,4,5-tetraaminobenzene, 3,3'-diaminobenzidine, 1,2,5,6-tetraaminonaphthalene, 2,3,6,7-tetraaminonaphthalene, 1,4,5,8-tetraaminonaphthalene, and any combination thereof; preferably wherein aromatic or heteroaromatic tetraamine comprises a compound selected from the group consisting of 2,3,5,6-tetraaminopyridine, 1,2,4,5-tetraaminobenzene, 3,3'-diaminobenzidine, 1,2,5,6-tetraaminonaphthalene, or 2,3,6,7-tetraaminonaphthalene, and any combination thereof. In other preferred embodiments, the aromatic or heteroaromatic tetraamine comprises a compound of formula Ia, Ib, Ic, or Id.

More preferably in tetraamine compounds of formula Ia, Ib, Ic, Id, or Ie, when Q is CR, R is independently H, alkyl, aryl, or heteroaryl. In certain preferred embodiments, the tetraamine comprises 2,3,5,6-tetraaminopyridine; typically greater than about 50 mole percent 2,3,5,6-tetraaminopyridine. In some embodiments, the aromatic or heteroaromatic diacid comprises a compound of formula IIa, IIb, IIc, or IId:

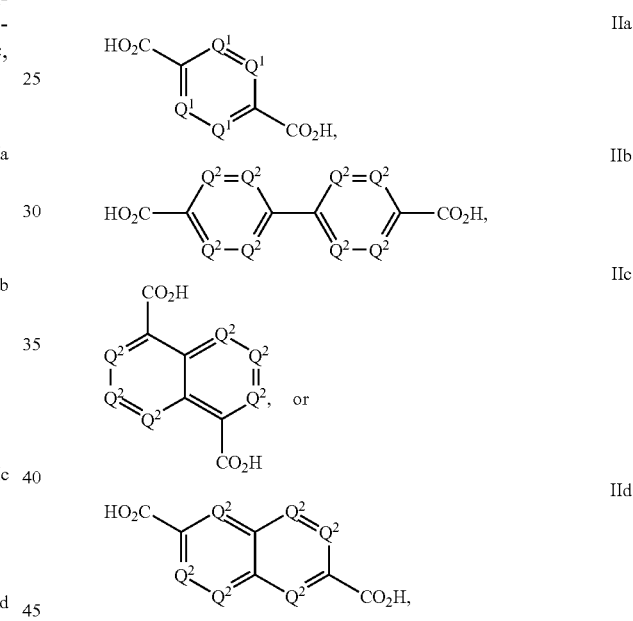

or any combination thereof,
wherein:
each $Q^1$ and $Q^2$ is independently $CR^1$ or N provided that in any compound of formula IIb, IIc, or IId, not more than one of $Q^2$ is N; and
each $R^1$ is independently H, OH, alkyl, aryl, heteroaryl, or alkoxy; preferably aromatic diacid comprises a compound selected from the group consisting of terephthalic acid, 2,5-dihydroxyterephthalic acid, 4,4'-bibenzoic acid, 2,6-naphthalenedicarboxylic acid, and any combination thereof. In certain preferred embodiments, the diacid comprises 2,5-dihydroxyterephthalic acid; typically greater than about 50 mole percent 2,5-dihydroxyterephthalic acid.

In certain other aspects of the invention, the process is carried out in the presence of an inert atmosphere, typically wherein inert atmosphere comprises greater than 90 percent, preferably greater than 99%, more preferably greater than 99.99% by weight nitrogen. In other aspects, the process further comprises metal powder, typically iron powder, tin powder, or any combination thereof; in certain embodiments, metal powder is present in an amount of from about 0.1 to about 1.0, preferably from about 0.1 to about 0.5 weight percent.

In certain other embodiments, the present invention is directed to processes for making polyareneazole comprising the steps of contacting aromatic or heteroaromatic tetraamine and aromatic or heteroaromatic diacid in a dehydrating solvent, wherein each amine group of said tetraamine is positioned on the aromatic or heteroaromatic ring moiety adjacent to at least one of the remaining amine groups of said tetraamine, and wherein the acid groups of said diacid are bonded to non-adjacent aromatic or heteroaromatic ring carbon atoms of said diacid; and heating with agitation to a temperature of about 90 to about 110° C. for a period of about 30 to about 100 minutes; further heating the mixture with agitation to a temperature of about 130 to about 145° C. for a period of about 75 to about 300 minutes; further heating the mixture with agitation to a temperature of about 175 to about 185° C. for a period of about 40 to about 90 minutes; and further heating the mixture with agitation to a temperature of about 186 to about 220° C. for a period of about 15 to about 90 minutes to provide said polyareneazole. In certain embodiments, the dehydrating solvent is typically polyphosphoric acid. In some embodiments, the complex comprises 2,3,5,6-tetraaminopyridine and terephthalic acid. In other embodiments, the aromatic or heteroaromatic tetraamine comprises a compound of formula Ia, Ib, Ic, Id, or Ie:

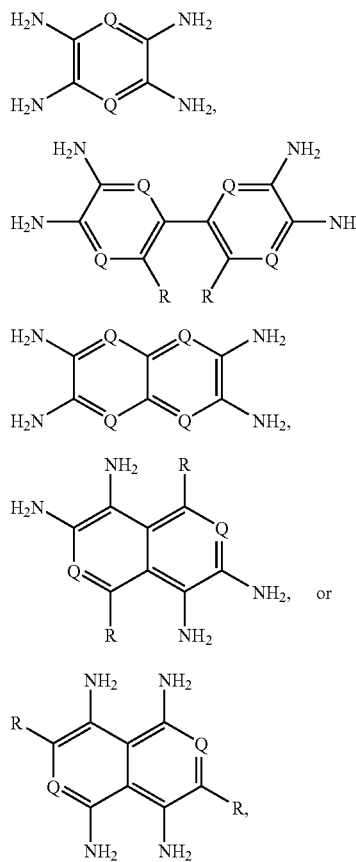

or any combination thereof, wherein:
each Q is independently CR or N; and
each R is independently H, alkyl, aryl, heteroaryl, or alkoxy; preferably wherein aromatic or heteroaromatic tetraamine comprises a compound selected from the group consisting of 2,3,5,6-tetraaminopyridine, 1,2,4,5-tetraaminobenzene, 3,3'-diaminobenzidine, 1,2,5,6-tetraaminonaphthalene, 2,3,6,7-tetraaminonaphthalene, 1,4,5,8-tetraaminonaphthalene, and any combination thereof. In other preferred embodiments, the aromatic or heteroaromatic tetraamine comprises a compound of formula Ia, Ib, Ic, or Id.

More preferably in tetraamine compounds of formula Ia, Ib, Ic, Id, or Ie, when Q is CR, R is independently H, alkyl, aryl, or heteroaryl. In certain preferred embodiments, the tetraamine comprises 2,3,5,6-tetraaminopyridine; typically greater than about 50 mole percent 2,3,5,6-tetraaminopyridine. In some embodiments, the aromatic or heteroaromatic diacid comprises a compound of formula IIa, IIb, IIc, or IId:

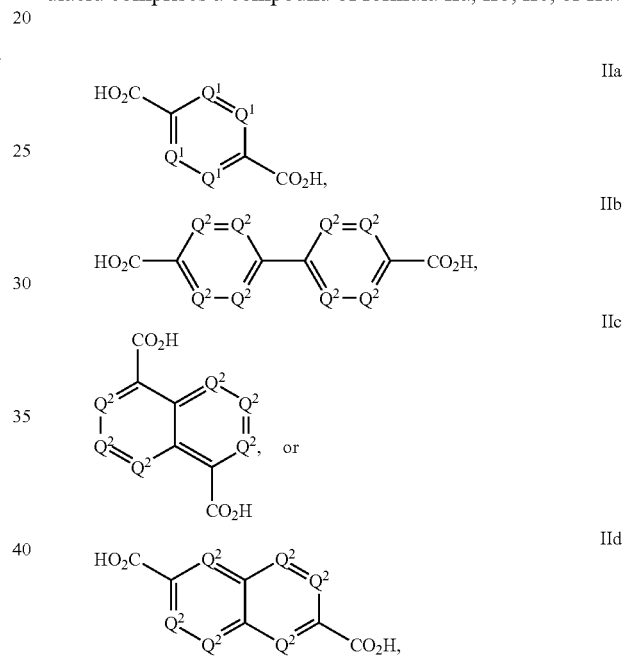

or any combination thereof,
wherein:
each $Q^1$ and $Q^2$ is independently $CR^1$ or N provided that in any compound of formula IIb, IIc, or IId, not more than one of $Q^2$ is N; and
each $R^1$ is independently H, OH, alkyl, aryl, heteroaryl, or alkoxy; preferably aromatic diacid comprises a compound selected from the group consisting of terephthalic acid, 2,5-dihydroxyterephthalic acid, 4,4'-bibenzoic acid, 2,6-naphthalenedicarboxylic acid, and any combination thereof. In certain preferred embodiments, the diacid comprises 2,5-dihydroxyterephthalic acid; typically greater than about 50 mole percent 2,5-dihydroxyterephthalic acid. In certain other aspects of the invention, the process is carried out in the presence of an inert atmosphere, typically wherein inert atmosphere comprises greater than 90 percent, preferably greater than 99%, yet more preferably greater than 99.99% by weight nitrogen. Various amounts and types of metal powders are useful for helping to build the molecular weight of polyareneazoles. In other aspects, the process further comprises metal powder, typically iron powder, tin powder, or any combination thereof; in certain embodiments, metal powder is present in an amount of from about 0.1 to about 1.0, preferably from about 0.1 to about 0.5 weight percent. In certain processes it is particularly preferred to use iron metal powder present in an amount of from about 0.1 to about 1.0 weight percent relative to the monomer complex quantity. Suitable iron metal powder will be particularly fine to provide sufficient surface area for catalyzing the polymerization reaction. In this regard, iron metal powder will suitably have a particle size that will pass through a 200 mesh screen.

The viscosity of the resulting polymer solutions are suitably determined by diluting the polymer solution product with a suitable solvent, such as methane sulfonic acid, to 0.05% concentration, and measuring one or more dilute solution viscosity values at 30° C. Molecular weight development of polyareneazole polymers of the present invention is suitably monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh} = \ln(V_{rel})/C,$$

where ln is the natural logarithm function and C is the concentration of the polymer solution. $V_{rel}$ is a unitless ratio, thus $V_{inh}$ is expressed in units of inverse concentration, typically as deciliters per gram ("dl/g"). Accordingly, in certain aspects of the present invention the polyareneazole polymers are produced having an inherent viscosity measured in 0.05 g/dl methane sulphonic acid at 30° C. of at least about 22 dl/g. The concentration of polymer in methane sulphonic acid is lower than that mentioned in Sikkema in order to obtain measurement in a reasonable amount of time due to the higher molecular weight polymers that result from the invention disclosed herein.

In various embodiments of the processes of the present invention, the azole-forming monomers suitably include 2,5-dimercapto-p-phenylene diamine, terephthalic acid, bis-(4-benzoic acid), oxy-bis-(4-benzoic acid), 2,5-dihydroxy-terephthalic acid, isophthalic acid, 2,5-pyridodicarboxylic acid, 2,6-napthalenedicarboxylic acid, 2,6-quinolinedicarboxylic acid, 2,6-bis(4-carboxyphenyl) pyridobisimidazole, 2,3,5,6-tetraaminopyridine, 4,6-diaminoresorcinol, 2,5-diaminohydroquinone, 1,4-diamino-2,5-dithiobenzene, and any combination thereof. Preferably, the azole forming monomers include 2,3,5,6-tetraaminopyridine and 2,5-dihydroxyterephthalic acid. In certain embodiments, it is preferred that that the azole-forming monomers are phosphorylated. Preferably, phosphorylated azole-forming monomers are polymerized in the presence of polyphosphoric acid and a metal catalyst.

Various azole-forming monomers can be selected for generating any of a number of polyareneazoles, and suitable polyareneazoles made according to certain embodiments of the processes of the present invention include polypyridoazoles, which preferably include polypyridobisimidazoles, which preferably include poly(1,4-(2,5-dihydroxy)phenylene-2,6-pyrido[2,3-d:5,6-d']bisimidazole.

Various monomers are selected for generating any of a number of polyareneazoles, and suitable polyareneazoles made according to certain embodiments of the processes of the present invention will include a polybenzazole, which preferably includes a polybenzobisoxazole.

The tetraamine-diacid complexes utilized in various embodiments of the invention may be provided in any number of ways, as one of skill in the art would recognize. By way of example only, a preparation a monomer complex comprising 2,3,5,6-tetraamino pyridine and 2,5-dihydroxy terephthalic acid monomers may be typically achieved by contacting a molar excess of a 2,3,5,6-tetraaminopyridine free base in water to a 2,5-dihydroxy terephthalic acid salt to form an aqueous mixture, and adjusting the pH of the aqueous mixture to within the range of from about 3 to about 5 to precipitate the monomer complex. almost any molar ratio of the 2,3,5,6-tetraaminopyridine free base to the 2,5-dihydroxy terephthalic acid dipotassium salt can be used. More typically, the molar ratio of the 2,3,5,6-tetraaminopyridine free base to the 2,5-dihydroxy terephthalic acid salt is in excess of about 1.05 to 1, even more typically in excess of about 1.075 to 1, and particularly in excess of about 1.15 to 1. The pH may be suitably maintained by adding an acid, preferably orthophosphoric acid, to the aqueous mixture. Typically, suitable salts include an alkaline salt of the 2,5-dihydroxy terephthalic acid salt and an ammonium salt of 2,5-dihydroxy terephthaic acid. Preferably, the alkaline salt of the 2,5-dihydroxy terephthalic acid is 2,5-dihydroxy terephthalic acid dipotassium salt.

The pH of the aqueous mixture is generally adjusted to precipitate the monomer complex. A suitable pH for precipitating the monomer complex is in the range of from about 4.3 to about 4.6.

After the monomer complex is formed, certain embodiments of the present invention also include one or ore additional steps of polymerizing the monomer complex to form a polyareneazole. In these embodiments, any of the monomers as described herein can be used for forming any of the polyareneazoles. For example, in certain embodiments, the polyareneazole, poly{2,6-diimidazo[4,5-b:4',5'-e]pyridinylene-1,4-(2,5-dihydroxy)phenylene}, is formed using a monomer complex composed of 2,3,5,6-tetraamino pyridine and 2,5-dihydroxy terephthalic acid monomers.

In certain embodiments of the present invention, there are provided poly{2,6-diimidazo[4,5-b:4',5'-e]pyridinylene-1,4-(2,5-dihydroxy)phenylene} polymers having an inherent viscosity measured in 0.05 g/dl methane sulphonic acid at 30° C. of typically at least about 22 dl/g, more typically at least about 25 dl/g, even more typically at least about 28 dl/g, and further typically at least about 30 dl/g. Various embodiments of the present invention also include filaments that can be prepared from these poly(1,4-(2,5-dihydroxy)phenylene-2,6-pyrido[2,3-d:5,6-d']bisimidazole polymers. For example, polymer dope solutions can be extruded or spun through a die or spinneret to prepare or spin a dope filament. The spinneret preferably contains a plurality of holes. The number of holes in the spinneret and their arrangement is not critical to the invention, but it is desirable to maximize the number of holes for economic reasons. The spinneret can contain as many as 100 or 1000 or more, and they may be arranged in circles, grids, or in any other desired arrangement. The spinneret may be constructed out of any materials that will not be degraded by the dope solution. In various embodiments, multifilament yarns comprising a plurality of filaments are also provided. The number of filaments per multifilament yarn is approximately the number of holes in the spinneret. Typically, the multifilament yarns prepared with filaments of the present invention have a yarn tenacity of at least about 24 gpd.

Certain embodiments of the present invention are discussed in reference to FIG. 1. In some embodiments, the polymer is formed in acid solvent providing the dope solution 2. In other embodiments, the polymer is dissolved in the acid solvent after formation. Either is within the ambit of the invention. Preferably the polymer is formed in acid solvent and provided for use in the invention. The dope solution 2, comprising polymer and polyphosphoric acid, typically contains a high enough concentration of polymer for the polymer to form an acceptable filament 6 after extrusion and coagulation. When the polymer is lyotropic liquid-crystalline, the concentration of polymer in the dope 2 is preferably high enough to provide a liquid-crystalline dope. The concentration of the polymer is preferably at least about 7 weight percent, more preferably at least about 10 weight percent and most preferably at least about 14 weight percent. The maximum concentration is typically selected primarily by practical factors, such as polymer solubility and dope viscosity. The concentration of polymer is preferably no more than 30 weight percent, and more preferably no more than about 20 weight percent.

The polymer dope solution 2 may contain additives such as anti-oxidants, lubricants, ultra-violet screening agents, colorants and the like which are commonly incorporated.

The polymer dope solution 2 is typically extruded or spun through a die or spinneret 4 to prepare or spin the dope filament. The spinneret 4 preferably contains a plurality of holes. The number of holes in the spinneret and their arrangement is not critical to the invention, but it is desirable to maximize the number of holes for economic reasons. The spinneret 4 can contain as many as 100 or 1000 or more holes, and they may be arranged in circles, grids, or in any other desired arrangement. The spinneret 4 may be constructed out of any materials that will not be degraded by the dope solution 2.

Fibers may be spun from solution using any number of processes; however, wet spinning and "air-gap" spinning are the best known. The general arrangement of the spinnerets and baths for these spinning processes is well known in the art, with the figures in U.S. Pat. Nos. 3,227,793; 3,414,645; 3,767,756; and 5,667,743 being illustrative of such spinning processes for high strength polymers. In "air-gap" spinning the spinneret typically extrudes the fiber first into a gas, such as air. Using FIG. 1 to help illustrate a process employing "air-gap spinning (also sometimes known as "dry-jet" wet spinning), dope solution 2 exiting the spinneret 4 enters a gap 8 (typically called an "air gap" although it need not contain air) between the spinneret 4 and a coagulation bath 10 for a very short duration of time. The gap 8 may contain any fluid that does not induce coagulation or react adversely with the dope, such as air, nitrogen, argon, helium, or carbon dioxide. The extruded dope 6 is drawn across the air gap 8, with or without stretching and immediately introduced into a liquid coagulation bath. Alternately, the fiber may be "wet-spun". In wet spinning, the spinneret typically extrudes the fiber directly into the liquid of a coagulation bath and normally the spinneret is immersed or positioned beneath the surface of the coagulation bath. Either spinning process may be used to provide fibers for use in the processes of the invention. In some embodiments of the present invention, air-gap spinning is preferred.

The extruded dope 6 is "coagulated" in the coagulation bath 10 containing water or a mixture of water and phosphoric acid, which removes enough of the polyphosphoric acid to prevent substantial stretching of the extruded dope 6 during any subsequent processing. If multiple fibers are extruded simultaneously, they may be combined into a multifilament yarn before, during or after the coagulation step. The term "coagulation" as used herein does not necessarily imply that the extruded dope 6 is a flowing liquid and changes into a solid phase. The extruded dope 6 can be at a temperature low enough so that it is essentially non-flowing before entering the coagulation bath 10. However, the coagulation bath 10 does ensure or complete the coagulation of the filament, i.e., the conversion of the polymer from a dope solution 2 to a substantially solid polymer filament 12. The amount of solvent, i.e., polyphosphoric acid, removed during the coagulation step will depend on the residence time of the dope filament in the coagulation bath, the temperature of the bath 10, and the concentration of solvent therein.

Without desiring to be bound by any particular theory of operation, it is believed that the present invention is, in part, based on the discovery that long term fiber properties are better preserved if residual phosphorus levels are low or the acidic polymeric phosphorous species have been converted to substantially monomeric species, preferably monomeric species that have been neutralized. In part, this may be achieved by hydrolyzing PPA prior to its removal from the fiber in the belief that substantially hydrolyzed polyphosphoric acid may be effectively removed from the fiber to achieve low residual phosphorus. Typically, PPA is substantially hydrolyzed under conditions whereby the fiber remains substantially non-hydrolyzed. Although many modes of practicing the invention are recognizable to one skilled in the art when armed with the present invention, PPA may be conveniently hydrolyzed by heating the filament or yarn prior to washing and/or neutralization steps. One manner of hydrolysis includes convective heating of the coagulated fiber for a short period of time. As an alternative to convective heating, the hydrolysis may be effected by heating the wet, as coagulated filament or yarn in a boiling water or aqueous acid solution. The heat treatment provides PPA hydrolysis while adequately retaining the tensile strength of the product fiber. The heat treatment step may occur in a separate cabinet 14, or as an initial process sequence followed by one or more subsequent washing steps in an existing washing cabinet 14.

In some embodiments, the hydrolysis and removal are provided by (a) contacting the dope filament with a solution in bath or cabinet 14 thereby hydrolyzing PPA and then (b) contacting the filament with a neutralization solution in bath or cabinet 16 containing water and an effective amount of a base under conditions sufficient to neutralize sufficient quantities of the phosphoric acid, polyphosphoric acid, or any combination thereof in the filament.

After treatment to substantially hydrolyze polyphosphoric acid (PPA) associated with the coagulated filament, hydrolyzed PPA may be removed from the filament or yarn 12 by washing in one or more washing steps to remove most of the residual acid solvent/and or hydrolyzed PPA from the filament or yarn 12. The washing of the filament or yarn 12 may be carried out by treating the filament or yarn 12 with a base, or with multiple washings where the treatment of the filament or yarn with base is preceded and/or followed by washings with water. The filament or yarn may also be treated subsequently with an acid to reduce the level of cations in the polymer. This sequence of washings may be carried out in a continuous process by running the filament through a series of baths and/or through one or more washing cabinets. FIG. 1 depicts one washing bath or cabinet 14. Washing cabinets typically comprise an enclosed cabinet containing one or more rolls which the filament travels around a number of times, and across, prior to exiting the cabinet. As the filament or yarn 12 travels around the roll, it is sprayed with a washing fluid. The washing fluid is continuously collected in the bottom of the cabinet and drained therefrom.

The temperature of the washing fluid(s) impacts on the diffusion rates controlling the washing process, making the temperature selection a matter of practical importance. Preferably, temperatures between 20 and 90 C are used, depending on the residence time desired. The washing fluid may be applied in vapor form (steam), but is more conveniently provided in liquid form. Preferably, a number of washing baths or cabinets are used. The residence time of the filament or yarn 12 in any one washing bath or cabinet 14 will depend on the desired concentration of residual phosphorus in the filament or yarn 12, but preferably the residence time is in the range of from about 1 second to less than about two minutes. In a continuous process, the duration of the entire washing process in the preferred multiple washing bath(s) and/or cabinet(s) is preferably no greater than about 10 minutes, more preferably more than about 5 seconds and no greater than about 160 seconds.

In some embodiments, preferred bases for the removal of hydrolyzed PPA include NaOH; KOH; $Na_2CO_3$; $NaHCO_3$; $K_2CO_3$; $KHCO_3$; ammonia; or trialkylamines, preferably tributylamine; or mixtures thereof. In one embodiment, the base is water soluble. Typical aqueous bases include NaOH, KOH, $Na_2CO_3$, $NaHCO_3$, $K_2CO_3$, and $KHCO_3$ or mixtures thereof; more typically NaOH.

After treating the fiber with base the process may optionally include the step of contacting the filament with a washing solution containing water or acid or both to remove all or substantially all excess base or base cations otherwise bound or associated with the polymer fiber. This washing solution can be applied in a washing bath or cabinet 18.

After washing, the fiber or yarn 12 may be dried in a dryer 20 to remove water and other liquids. The temperature in the dryer is typically 80° C. to 130° C. The dryer residence time is typically 5 seconds to perhaps as much as 5 minutes at lower temperatures. The dryer can be provided with a nitrogen or other non-reactive atmosphere. Then the fiber may be optionally further processed in, for instance, a heat setting device 22. Further processing may be done in a nitrogen purged tube furnace 22 for increasing tenacity and/or relieving the mechanical strain of the molecules in the filaments. Finally, the filament or yarn 12 is wound up into a package on a windup device 24. Rolls, pins, guides, and/or motorized devices 26 are suitably positioned to transport the filament or yarn through the process.

Shaped articles as described herein include extruded or blown shapes or films, molded articles, and the like. Films can be made by known techniques such as (1) casting the dope onto a flat surface, (2) extruding the dope through an extruder to form a film, or (3) extruding and blowing the dope film to form an extruded blown film. Typical techniques for dope film extrusion include processes similar to those used for fibers, where the solution passes through a spinneret or die into an air gap or fluid layer and subsequently into a coagulant bath. More details describing the extrusion and orientation of dope films can be found in Pierini et al. (U.S. Pat. No. 5,367,042); Chenevey, (U.S. Pat. No. 4,898,924); Harvey et al., (U.S. Pat. No. 4,939,235); and Harvey et al., (U.S. Pat. No. 4,963,428). Typically the dope film prepared is preferably no more than about 250 mils (6.35 mm) thick and more preferably it is at most about 100 mils (2.54 mm) thick.

Preferably, the phosphorus content of the dried filaments after removal of the hydrolyzed PPA is less than about 5,000 ppm (0.5%) by weight, and more preferably, less than about 4,000 ppm (0.4%) by weight, and most preferably less than about 2,000 ppm (0.2%) by weight.

The invention is further directed, in part, to a yarn comprising a plurality of the filaments of the present invention, fabrics that include filaments or yarns of the present invention, and articles that include filaments, fibers, or fabrics of the present invention.

EXAMPLES

Experimental Test Methods

The test methods described below were used in the following Examples.

Temperature: All temperatures are measured in degrees Celsius (° C.).

Denier is determined according to ASTM D 1577 and is the linear density of a fiber as expressed as weight in grams of 9000 meters of fiber.

Tenacity is determined according to ASTM D 885 and is the maximum or breaking stress of a fiber as expressed as grams per denier.

Elemental Analysis: Elemental analysis of alkaline cation (M) and phosphorus (P) is determined according to the inductively coupled plasma (ICP) method as follows. A sample (1-2 grams), accurately weighed, is placed into a quartz vessel of a CEM Star 6 microwave system. Concentrated sulfuric acid (5 ml) is added and swirled to wet. A condenser is connected to the vessel and the sample is digested using the moderate char method. This method involves heating the sample to various temperatures up to 260° C. to char the organic material. Aliquots of nitric acid are automatically added by the instrument at various stages of the digestion. The clear, liquid final digestate is cooled to room temperature and diluted to 50 ml with deionized water. The solution may be analyzed on a Perkin Elmer optima inductively coupled plasma device using the manufacturers' recommended conditions and settings. A total of twenty-six different elements may be analyzed at several different wavelengths per sample. A 1/10 dilution may be required for certain elements such as sodium and phosphorus. Calibration standards are from 1 to 10 ppm.

Process Examples

Many of the examples in the table are given to illustrate various embodiments of the invention and should not be interpreted as limiting it in any way. All polymer solids concentrations, weight percents based on monomer, and polymer solution percent P205 concentrations are expressed on the basis of TD-complex as a 1:1 molar complex between TAP and DHTA. (TD-complex is believed to be a monohydrate.)

In the following examples, poly{2,6-diimidazo[4,5-b:4', 5'-e]pyridinylene-1,4-(2,5-dihydroxy)phenylene}filaments (also referred to herein as "PIPD", shown below in one of its tautomeric forms) were spun from a polymer solution consisting of 18 weight percent of PIPD in polyphosphoric acid. The solution was extruded from a spinneret, drawn across an air gap and coagulated in water. The yarns were then wound up wet onto bobbins without additional steps. If the yarns were not processed within 6 hours the bobbin-wound wet yarns were refrigerated until further processed.

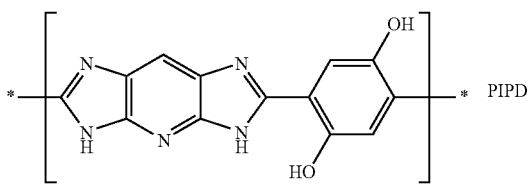

PIPD

Example 1

Preparation of Tetraamine-Diacid Complex (TD Complex)

Example for Making TD complex with 10% Excess 2,3,5,6-tetraaminopyridine (TAP)

This example illustrates the use of 10.0 percent molar excess of 2,3,5,6-tetraaminopyridine (TAP) in the making of monomer complex (TD complex)by a directly coupled process. A dipotassium salt of 2,5-dihydroxy terephthalic acid ($K_2$-DHTA)/sodium dithionate ($Na_2S_2O_4$) solution was prepared in a vessel by combining 126.81 grams of $K_2$-DHTA, 2208 grams of water, and 2.2 grams sodium dithionate ($Na_2S_2O_4$).

In an autoclave, 103.3 grams of 2,6-diamino-3,5-dinitropyridine (DADNP), 508 grams water, 2.04 gram 5% Pt/C catalyst (using 1 gram of catalyst per dry basis) and 10 grams of ammonium hydroxide were combined and heated at 65° C. at 500 psig. Hydrogenation of the DADNP was complete in 2 hours. After venting and cooling to 30° C., about 15 g of Darco G60 activated carbon in 100 g water was added as a slurry to the autoclave and mixed for 1 hour. The solution was then filtered to remove the catalyst followed by a single CUNO Biocap 30 54SP filter. The filtration took 30 minutes and the color of the filtered solution was clear throughout the transfer.

The colorless TAP solution was added to the $K_2$-DHTA/$Na_2S_2O_4$ solution with mixing at 50° C. The color of the $K_2$-DHTA/$Na_2S_2O_4$ solution was light yellow and did not change during the TAP addition the pH of the TAP/$K_2$-DHTA mixture was 10.0. The autoclave and filters were then rinsed with 100 g $H_2O$ which was added to the vessel. The theoretical amount of TAP, including DADNP purity (98%) that could have been made, filtered, and transferred to the mix vessel was 68.8 g (0.494 mol) giving a maximum TAP/$K_2$-DHTA molar ratio of 1.10.

A 150 ml of pre-mixed phosphate buffer solution (pH=4.7) was diluted with 600 ml water and precharged in a coupling vessel and heated to 50° C. while mixing. The basic TAP/$K_2$-DHTA mixture (pH=10) was then added to the coupling vessel while simultaneously adding 25% aqueous $H_3PO_4$ to control the pH around 4.5. Large amounts of fine light-yellow monomer complex crystals formed almost immediately and increased during the addition. The final pH was brought to 4.5 while the monomer complex slurry cooled to 30° C. The slurry was then filtered giving a pale yellow cake. The monomer complex cake was washed 3 times with 400 g each of water followed by 200 g of ethanol before being set to purge with nitrogen overnight. The color of the cake was pale yellow.

Example 2

A series of batch polymerizations were completed to illustrate the process of this invention. In polymerization runs 1-5 (Table I) the following were combined in a clean dry 4CV Model DIT Mixer that was continuously purged with nitrogen gas:
a) 663.0 grams of polyphosphoric acid (PPA) having a concentration of 85.15% $P_2O_5$,
b) 112.5 grams $P_2O_5$,
c) 1.15 grams of tin powder (325 mesh and available from VWR Scientific, West Chester, Pa.); This amount of tin powder is approximately 0.5 weight percent based on the amount of TD complex), and
d) 230.0 grams of TD complex (from Example 1).

In polymerization Runs 6-7 (Table I) the following were combined in a clean dry 4CV Model DIT Mixer that was continuously purged with nitrogen gas:
a) 682.1 grams of polyphosphoric acid (PPA) having a concentration of 85.65% $P_2O_5$,
b) 89 grams $P_2O_5$,
c) 1.15 grams of tin powder (325 mesh and available from VWR Scientific, West Chester, Pa.); This amount of tin powder is approximately 0.5 weight percent based on the amount of TD complex), and
d) 228.9 grams of TD complex (from Example 1).

The CV Model was an oil-heated twin cone reactor that used intersecting dual helical-conical blades that intermesh throughout the conical envelope of the bowl. The mixer blades were started and set at 80 rpm for Runs 1-5 (Table I). For Runs 6-8 (Table I), the mixer blades were started and set at 80 rpm and a vacuum was pulled on the reaction mixture in such a way as to moderate the foaming of the mixture during the reaction. The temperature of the reaction mixture was measured using a thermocouple.

In all polymerization runs, the mixer temperature was raised to 100° C. and held for 1 hour, and then the temperature was then raised to 137° C. and held for 4 hours. The temperature of the mixer was then raised and held at that temperature for either one or two more steps as shown in Table I. The mixer was purged with nitrogen and the polymer solution was discharged into a glass vessel. The polymer was removed from the mixer in the form of a 18% polymer in a PPA. A sample of the resulting polymer solution was diluted in methane sulfonic acid (MSA) at a concentration of 0.05% polymer solids. The inherent viscosity of the resulting polymer samples are shown in Table I.

TABLE I

| Item | Time at 180° C. (hours) | Time at 190° C. (hours) | Time at 200° C. (hours) | Inherent Viscosity (dl/g) |
| --- | --- | --- | --- | --- |
| 1 | 2 | 0 | 0 | 26.3 |
| 2 | 0 | 2 | 0 | 22.5 |
| 3 | 1 | 1 | 0 | 27.9 |
| 4 | 1 | 0 | 1 | 27.8 |
| 5 | 1 | 2 | 0 | 27.8 |
| 6 | 1 | 0.5 | 0 | 29.1 |
| 7 | 1 | 0.75 | 0 | 30.4 |
| 8 | 1 | 1 | 0 | 31.4 |

Example 3

Into a 200 ml glass tubular reactor around which a heating jacket is arranged and which is quipped with the necessary connections for letting in $N_2$ and applying a vacuum, and which further contains an anchor-shaped stirrer, are charged 15 g (0.0563 mole) of 2,3,5,6-tetraaminopyridine-trihydrochloride-monohydrate (for which a preparation method is described by Gerber in J. Pol. Sci. (Pol. Chem.) 11 (1973), 1703), 11.15 g (0.0563 mole) of 2,5-dihydroxyterephthalic acid (for which a preparation method is described in AT-A-263 754), 10.98 g of $P_2O_5$, and 75.48 g of 84% polyphosphoric acid. All air is displaced by nitrogen by evacuation and admitting nitrogen several times. In 3 hours the temperature is raised to 105° C., followed by one hour's lowering of the pressure to 40 mbar while maintaining a slight flow of nitrogen above the mixture. Over the next 30 minutes the temperature is raised to 130° C., with all solids going into solution. The vacuum is released by admitting nitrogen and a slow nitrogen purge is installed. After 2 hours of stirring at 140° C., the temperature is raised over 2½ hours with stirring to 180° C. The mixer is then purged with nitrogen and the polymer solution is discharged into a glass vessel. The polymer is removed from the mixer in the form of an 18% polymer in PPA. The IV of the polymer was found to be 13.

The disclosures of each patent, patent application and publication cited or describes in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A process for making polyareneazole comprising the steps of:
   contacting a complex comprising aromatic or heteroaromatic tetraamine and aromatic or heteroaromatic diacid in a dehydrating solvent;
   wherein each amine group of said tetraamine is positioned on the aromatic or heteroaromatic ring moiety adjacent to at least one of the remaining amine groups of said tetraamine, and
   wherein the acid groups of said diacid are bonded to non-adjacent aromatic or heteroaromatic ring carbon atoms of said diacid; and
   a) heating with agitation to a temperature of about 90 to about 110° C. for a period of about 30 to about 100 minutes;
   b) heating the product of step a) with agitation to a temperature of about 130 to about 145° C. for a period of about 75 to about 300 minutes;
   c) heating the product of step b) with agitation to a temperature of about 175 to about 185° C. for a period of about 40 to about 90 minutes; and
   d) heating the product of step c) with agitation to a temperature of about 186 to about 220° C. for a period of about 15 to about 90 minutes to provide said polyareneazole.

2. The process of claim 1, wherein the dehydrating solvent is polyphosphoric acid.

3. The process of claim 1, wherein the aromatic or heteroaromatic tetraamine comprises a compound of formula Ia, Ib, Ic, Id, or Ie:

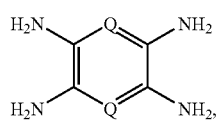
Ia

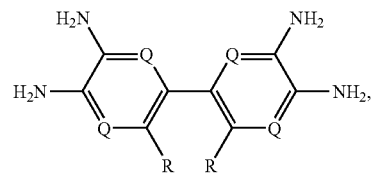
Ib

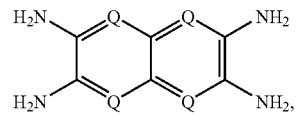
Ic

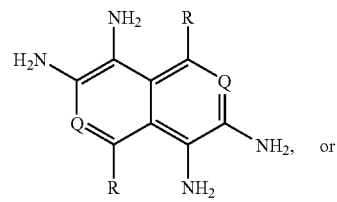
Id

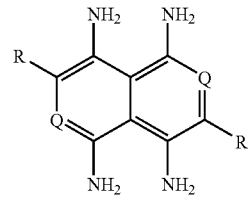
Ie or any combination thereof,
wherein:
each Q is independently CR or N; and
each R is independently H, alkyl, aryl, heteroaryl, or alkoxy.

4. The process of claim 3, wherein the aromatic or heteroaromatic tetraamine comprises a compound of formula Ia, Ib, Ic, or Id:

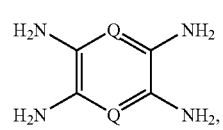
Ia

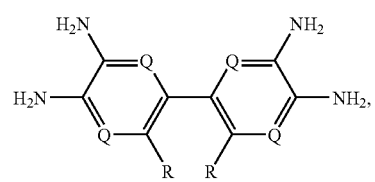
Ib

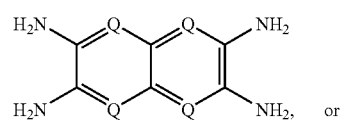
Ic

-continued

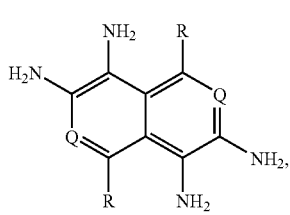

Id or any combination thereof,
wherein:
each Q is independently CR or N; and
each R is independently H, alkyl, aryl, heteroaryl, or alkoxy.

5. The process of claim 3, wherein each R is independently H, alkyl, aryl, or heteroaryl.

6. The process of claim 3, wherein aromatic or heteroaromatic tetraamine comprises a compound selected from the group consisting of 2,3,5,6-tetraaminopyridine, 1,2,4,5-tetraaminobenzene, 3,3'-diaminobenzidine, 1,2,5,6-tetraaminonaphthalene, 2,3,6,7-tetraaminonaphthalene, 1,4,5,8-tetraaminonaphthalene, and any combination thereof.

7. The process of claim 6, wherein aromatic or heteroaromatic tetraamine comprises a compound selected from the group consisting of 2,3,5,6-tetraaminopyridine, 1,2,4,5-tetraaminobenzene, 3,3'-diaminobenzidine, 1,2,5,6-tetraaminonaphthalene, 2,3,6,7-tetraaminonaphthalene, and any combination thereof.

8. The process of claim 1, wherein the aromatic or heteroaromatic diacid comprises a compound of formula IIa, IIb, IIc, or IId:

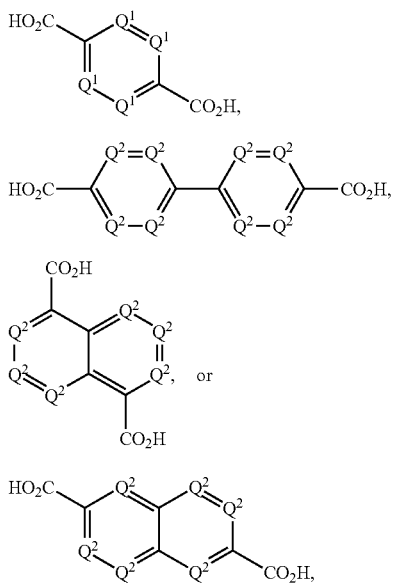

or any combination thereof, wherein:
each $Q^1$ and $Q^2$ is independently $CR^1$ or N provided that in any compound of formula IIb, IIc, or IId, not more than one of $Q^2$ is N; and
each $R^1$ is independently H, OH, alkyl, aryl, heteroaryl, or alkoxy.

9. The process of claim 1, wherein aromatic diacid comprises a compound selected from the group consisting of terephthalic acid, 2,5-dihydroxyterephthalic acid, 4,4'-bibenzoic acid, 2,6-naphthalenedicarboxylic acid, and any combination thereof.

10. The process of claim 1, wherein the process is carried out in the presence of an inert atmosphere.

11. The process of claim 1, wherein inert atmosphere comprises greater than 99 percent by weight nitrogen.

12. The process of claim 1, further comprising metal powder.

13. The process of claim 12, wherein the metal powder is iron powder, tin powder, or any combination thereof.

14. The process of claim 13, wherein metal powder is present in an amount of from about 0.1 to about 0.5 weight percent.

15. The process of claim 7, wherein the tetraamine comprises 2,3,5,6-tetraaminopyridine.

16. The process of claim 15, wherein the tetraamine comprises greater than about 50 mole percent 2,3,5,6-tetraaminopyridine.

17. The process of claim 9, wherein the diacid comprises 2,5-dihydroxyterephthalic acid.

18. The process of claim 17, wherein the diacid comprises greater than about 50 mole percent 2,5-dihydroxyterephthalic acid.

19. The process of claim 1, wherein the complex comprises 2,3,5,6-tetraaminopyridine and terephthalic acid.

20. A process for making polyareneazole comprising the steps of:
contacting aromatic or heteroaromatic tetraamine and aromatic or heteroaromatic diacid in a dehydrating solvent;
wherein each amine group of said tetraamine is positioned on the aromatic or heteroaromatic ring moiety adjacent to at least one of the remaining amine groups of said tetraamine, and
wherein the acid groups of said diacid are bonded to non-adjacent aromatic or heteroaromatic ring carbon atoms of said diacid; and
a) heating with agitation to a temperature of about 90 to about 110° C. for a period of about 30 to about 100 minutes;
b) heating the product of step a) with agitation to a temperature of about 130 to about 145° C. for a period of about 75 to about 300 minutes;
c) heating the product of step b) with agitation to a temperature of about 175 to about 185° C. for a period of about 40 to about 90 minutes; and
d) heating the product of step c) with agitation to a temperature of about 186 to about 220° C. for a period of about 15 to about 90 minutes to provide said polyareneazole.

* * * * *